(No Model.)

J. T. SMITH.
SNAP HOOK.

No. 472,718. Patented Apr. 12, 1892.

Witnesses:
Julius Ulke Jr.
W. F. Duval

Inventor
John T. Smith.
By his Attorneys,
C. A. Snow & Co.

UNITED STATES PATENT OFFICE.

JOHN T. SMITH, OF SABULA, IOWA.

SNAP-HOOK.

SPECIFICATION forming part of Letters Patent No. 472,718, dated April 12, 1892.

Application filed October 27, 1891. Serial No. 410,005. (No model.)

*To all whom it may concern:*

Be it known that I, JOHN T. SMITH, a citizen of the United States, residing at Sabula, in the county of Jackson and State of Iowa, have invented a new and useful Snap-Hook, of which the following is a specification.

This invention relates to improvements in snap-hooks; and the objects of the invention are to provide a cheap and simple construction of hook especially adapted for connecting reins to bit-rings, and which is so constructed as will permit of an easy removal of the ring from the snap when desired and yet prevent any accidental disconnection of the two, and, furthermore, that shall be devoid of hinges or springs in any way liable to become impaired by use.

Other objects and advantages of the invention will appear in the following description, and the novel features thereof will be particularly pointed out in the claims.

Figure 1:
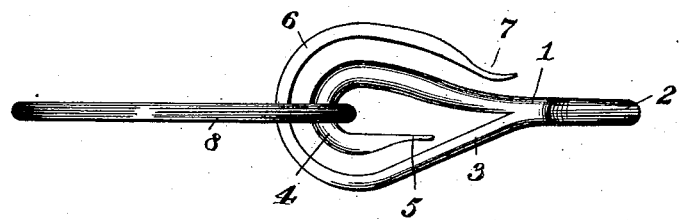
Figure 2:
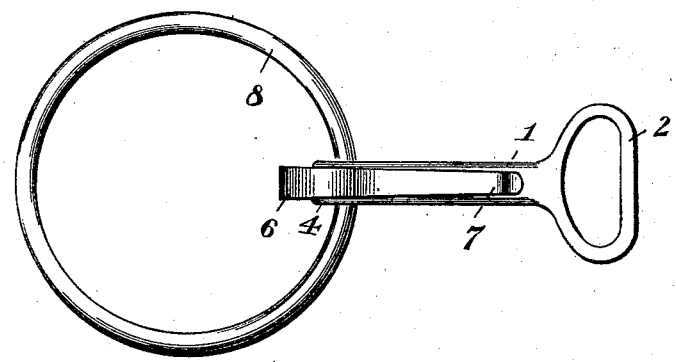

Referring to the drawings, Figure 1 is an elevation of a snap constructed in accordance with my invention. Fig. 2 is a plan of the same.

Like numerals of reference indicate like parts in both the figures of the drawings.

In constructing the hook I employ a rod of iron of suitable length, bifurcating the same from one end to a point near its rear end. The unbifurcated end is bent to form an ordinary eye 2, adapted to be buckled to the end of a rein or other strap. By bifurcating the rod a pair of terminals 1 and 3 are formed, the latter being drawn out, so as to be somewhat longer than the former. The terminal 1 is in line with the shank and has its outer end bent to form an ordinary hook 4, and at said extremity or free end is somewhat abruptly reduced or flattened to form a spring-tongue 5 and bent outwardly slightly. The companion terminal 3, which has its point of connection nearly opposite the tongue 5, is also bent to form a hook, (designated at 6,) but slightly larger than the hook 4 and inclosing the same. The extremity of the hook 6, which occurs substantially opposite the beginning of the hook 4, is reduced gradually to form a spring-tongue 7, the extreme end of which is slightly inwardly curved and finally deflected from the terminal 1, to which it is adjacent. Between the terminal 3 and the tongue 5 of the hook 4 and the tongue 7 and the terminal 1 the space between the hooks is narrower than at any other point and is slightly narrower than an ordinary bit-ring 8, so that the tongues are forced away from their shanks or body portions of their respective hooks when in the act of introducing a ring.

In order to connect the ring with the hook, the former is first pushed under and by the tongue 7, moved around into the large hook 6, and pushed past the tongue 5, and then finally engaged with the inner hook 4. It will be seen that when thus connected any accidental disconnection of the ring with the hook as a whole is impossible. It will also be observed that by moving the ring to the upper portion of the hook 4, then following the contour of the hook 6, the ring may be pulled by the tongue 5 into the hook 6 and from the same. The operation of connecting and disconnecting the ring from the hook may be carried on without the necessity of the driver removing his gloves, and very readily in the dark, as there are no lugs or springs to find and press, but simply the ring and hook need be grasped, and the former slid around within the latter, and will be readily guided to the proper openings.

Having described my invention, what I claim is—

1. The herein-described hook, formed of a single piece of metal, the same consisting of a shank terminating at one end in an eye and having its opposite end bifurcated, which bifurcations are bent in reverse directions to form hooks and arranged in the same plane, the hook of one terminal being larger than and inclosing the hook of the opposite terminal, the two combining to form an intermediate space, substantially as specified.

2. The herein-described improved snap-hook, formed of a single piece of metal, the same consisting of a shank having its end bifurcated to form terminals, said terminals being bent in reverse directions to form hooks lying in the same plane, the hook of one terminal inclosing that of the other, the two combining to form an intermediate ring-passage, and the extremities of the hooks reduced to form spring-tongues and inwardly bent and terminating adjacent to the shanks of the hooks, whereby reduced entrances to the passages are formed, substantially as specified.

3. The herein-described improved snap-hook, formed of a single piece of metal, the same consisting of a shank having one of its ends bifurcated to form terminals, which are diverged and bent in reverse directions to form hooks lying in the same plane, the hook of one terminal inclosing that of the other and the two combining to form an intermediate ring-passage, substantially as specified.

In testimony that I claim the foregoing as my own I have hereto affixed my signature in the presence of two witnesses.

JOHN T. SMITH.

Witnesses:
  THOS. LAMBERT,
  J. D. COTTON.